US011893210B2

(12) United States Patent
Simon

(10) Patent No.: US 11,893,210 B2
(45) Date of Patent: Feb. 6, 2024

(54) CONTROL OVERLAY FOR USER INTERFACE ELEMENTS

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/502,616

(22) Filed: Oct. 15, 2021

(65) Prior Publication Data

US 2023/0120912 A1    Apr. 20, 2023

(51) Int. Cl.
*G06F 3/0482*    (2013.01)
*G06F 3/04847*    (2022.01)

(52) U.S. Cl.
CPC ........ *G06F 3/0482* (2013.01); *G06F 3/04847* (2013.01)

(58) Field of Classification Search
CPC .......................... G06F 3/0482; G06F 3/04847
See application file for complete search history.

(56) References Cited

U.S. PATENT DOCUMENTS

| | | | |
|---|---|---|---|
| 8,375,316 B2* | 2/2013 | Stallings | G06F 3/0488 715/822 |
| 2005/0086211 A1* | 4/2005 | Mayer | H04L 51/04 |
| 2006/0026536 A1* | 2/2006 | Hotelling | G06F 3/04883 715/863 |
| 2010/0267449 A1* | 10/2010 | Gagner | G06F 3/0488 463/30 |
| 2011/0083104 A1* | 4/2011 | Minton | G06F 3/04886 345/173 |
| 2011/0167382 A1* | 7/2011 | van Os | G06Q 10/109 715/810 |
| 2013/0205192 A1* | 8/2013 | Spada | G06F 8/38 715/227 |
| 2020/0192567 A1* | 6/2020 | Norris, III | G06F 3/04883 |
| 2020/0379635 A1* | 12/2020 | Hughes | G06F 3/0481 |
| 2021/0074425 A1* | 3/2021 | Carter | G06N 20/20 |

* cited by examiner

*Primary Examiner* — Jennifer N Welch
*Assistant Examiner* — Ashley M Fortino
(74) *Attorney, Agent, or Firm* — Buckley, Maschoff & Talwalkar LLC

(57) ABSTRACT

Provided are systems and methods which generate and display a control overlay for user interface elements such as checkboxes and the like. The control overlay provides a larger selection area than an underlying user interface element. In one example, the method may include receiving a request associated with a user interface element from among a plurality of user interface elements displayed within a user interface, the user interface element comprising a selectable area, displaying a control overlay for the user interface element via the user interface, the control overlay being partially translucent and comprising a selectable area that is larger than and encompasses the selectable area of the user interface element, detecting an input command via the selectable area of the control overlay, and in response to the detection of the input command, selecting the user interface element displayed via the user interface.

20 Claims, 14 Drawing Sheets

FIG. 2A

Items (10)

| User Name | Document | Available | Signature | Verified | Uploaded On |
|---|---|---|---|---|---|
| User A | Doc.71025.pdf | ☐ | /User A/ | ☐ | 4/29/2021 |
| User B | Doc.2113.pdf |  | /User B/ | ☐ | 5/23/2021 |
| User C | Doc.078.pdf | ☒ | /User C/ | ☐ | 4/19/2021 |
| User D | Doc.01259.pdf |  | /User D/ | ☐ | 5/03/2021 |
| User E | Doc.34887.pdf | ☐ | /User E/ | ☐ | 5/13/2021 |
| User F | Doc.9012.pdf | ☐ | /User F/ | ☐ | 4/27/2021 |
| User G | Doc.98671.pdf |  | /User G/ | ☐ | 3/30/2021 |
| User H | Doc.Tm832.pdf |  | /User H/ | ☐ | 5/07/2021 |
| User I | Doc.3058.pdf |  | /User I/ | ☐ | 4/16/2021 |
| User K | Doc.Doc.pdf |  | /User K/ | ☐ | 5/08/2021 |

Items (10)

| User Name | Document | Avail | Signature | Verified | Uploaded On |
|---|---|---|---|---|---|
| User A | Doc.71025.pdf | ☐ | /User A/ | ☐ | 4/29/2021 |
| User B | Doc.2113.pdf | ☑ | /User B/ | ☐ | 5/23/2021 |
| User C | Doc.078.pdf | | /User C/ | ☐ | 4/19/2021 |
| User D | Doc.01259.pdf | ☐ | /User D/ | ☐ | 5/03/2021 |
| User E | Doc.34887.pdf | ☐ | /User E/ | ☐ | 5/13/2021 |
| User F | Doc.9012.pdf | | /User F/ | ☐ | 4/27/2021 |
| User G | Doc.98671.pdf | | /User G/ | ☐ | 3/30/2021 |
| User H | Doc.Tm832.pdf | | /User H/ | ☐ | 5/07/2021 |
| User I | Doc.3058.pdf | | /User I/ | ☐ | 4/16/2021 |
| User K | Doc.Doc.pdf | | /User K/ | ☐ | 5/08/2021 |

210

217 — Control Overlay(s)

218 — Search...

223

213 — Avail

FIG. 2D

Items (10)

| User Name | Document | Available | Signature | Verified | Uploaded On |
|---|---|---|---|---|---|
| User A | Doc.71025.pdf | 244 | /User A/ | ☐ | 4/29/2021 |
| User B | Doc.2113.pdf | 245 | /User B/ | ☐ | 5/23/2021 |
| User C | Doc.078.pdf | 246 ✓ | /User C/ | ☐ | 4/19/2021 |
| User D | Doc.01259.pdf | | /User D/ | ☐ | 5/03/2021 |
| User E | Doc.34887.pdf | | /User E/ | ☐ | 5/13/2021 |
| User F | Doc.9012.pdf | | /User F/ | ☐ | 4/27/2021 |
| User G | Doc.98671.pdf | | /User G/ | ☐ | 3/30/2021 |
| User H | Doc.Tm832.pdf | | /User H/ | ☐ | 5/07/2021 |
| User I | Doc.3058.pdf | | /User I/ | ☐ | 4/16/2021 |
| User K | Doc.Doc.pdf | | /User K/ | ☐ | 5/08/2021 |

Control Overlay(s)

Search....

FIG. 2E

Items (10)

| User Name | Document | Available | | | | | | Signature | Verified | Uploaded On |
|---|---|---|---|---|---|---|---|---|---|---|
| User A | Doc.71025.pdf | | | | | | | /User A/ | ☐ | 4/29/2021 |
| User B | Doc.2113.pdf | | | | | | | /User B/ | ☐ | 5/23/2021 |
| User C | Doc.078.pdf | | ✓ | | | | | /User C/ | ☐ | 4/19/2021 |
| User D | Doc.01259.pdf | | | | | | | /User D/ | ☐ | 5/03/2021 |
| User E | Doc.34887.pdf | | | | | | | /User E/ | ☐ | 5/13/2021 |
| User F | Doc.9012.pdf | | | | | ✱ | | /User F/ | ☐ | 4/27/2021 |
| User G | Doc.98671.pdf | | | | | | | /User G/ | ☐ | 3/30/2021 |
| User H | Doc.Tm832.pdf | | | | | | | /User H/ | ☐ | 5/07/2021 |
| User I | Doc.3058.pdf | | | | | | | /User I/ | ☐ | 4/16/2021 |
| User K | Doc.Doc.pdf | | | | | | | /User K/ | ☐ | 5/08/2021 |

Control Overlay(s) 217

Search...

Items (10)

Control Overlay(s)   Search...

| User Name | Document | Available | Signature | Verified | Uploaded On |
|---|---|---|---|---|---|
| User A | Doc.710_.pdf | | /User A/ | ☐ | 4/29/2021 |
| User B | Doc.211_.pdf | | /User B/ | ☐ | 5/23/2021 |
| User C | Doc.078_.pdf | ✓ | /User C/ | ☐ | 4/19/2021 |
| User D | Doc.012_.pdf | | /User D/ | ☐ | 5/03/2021 |
| User E | Doc.348_.pdf | | /User E/ | ☐ | 5/13/2021 |
| User F | Doc.901_.pdf | ✓ | /User F/ | ☐ | 4/27/2021 |
| User G | Doc.980_.pdf | | /User G/ | ☐ | 3/30/2021 |
| User H | Doc.Tm_.pdf | | /User H/ | ☐ | 5/07/2021 |
| User I | Doc.305_.pdf | | /User I/ | ☐ | 4/16/2021 |
| User K | Doc.Do_ | | /User K/ | ☐ | 5/08/2021 |

Items (10)

| User Name | Document | Available | Signature | Verify | Uploaded On |
|---|---|---|---|---|---|
| User A | Doc.71025.pdf | | /User A/ | | 4/29/2021 |
| User B | Doc.2113.pdf | | /User B/ | | 5/23/2021 |
| User C | Doc.078.pdf | ✓ | /User C/ | | 4/19/2021 |
| User D | Doc.01259.pdf | | /User D/ | | 5/03/2021 |
| User E | Doc.34887.pdf | | /User E/ | | 5/13/2021 |
| User F | Doc.9012.pdf | ✓ | /User F/ | | 4/27/2021 |
| User G | Doc.98671.pdf | | /User G/ | | 3/30/2021 |
| User H | Doc.Tm832.pdf | | /User H/ | | 5/07/2021 |
| User I | Doc.3058.pdf | | /User I/ | | 4/16/2021 |
| User K | Doc.Doc.pdf | | /User K/ | | 5/08/2021 |

Control Overlay(s) — 217

Search... — 225

Items (10)

| User Name | Document | Available | Signature | Verified | Uploaded On |
|---|---|---|---|---|---|
| User A | Doc.71025.pdf | ☐ | /User A/ | | 4/29/2021 |
| User B | Doc.2113.pdf | | /User B/ | | 5/23/2021 |
| User C | Doc.078.pdf | ✓ | /User C/ | | 4/19/2021 |
| User D | Doc.01259.pdf | | /User D/ | | 5/03/2021 |
| User E | Doc.34887.pdf | | /User E/ | | 5/13/2021 |
| User F | Doc.9012.pdf | ✓ | /User F/ | | 4/27/2021 |
| User G | Doc.98671.pdf | ☐ | /User G/ | | 3/30/2021 |
| User H | Doc.Tm832.pdf | | /User H/ | | 5/07/2021 |
| User I | Doc.3058.pdf | | /User I/ | | 4/16/2021 |
| User K | Doc.Doc.pdf | | /User K/ | | 5/08/2021 |

Items (10)

Control Overlay(s) 218

Mode 252
251 — Modal    Non-Modal — 250

| User Name | Document | Available | Signature | Verified | Uploaded on |
|---|---|---|---|---|---|
| User A | Doc.71025.pdf | | /User A/ | ☐ | 4/29/2021 |
| User B | Doc.2113.pdf | | /User B/ | ☐ | 5/23/2021 |
| User C | Doc.078.pdf | ✓ | /User C/ | ☐ | 4/19/2021 |
| User D | Doc.01259.pdf | | /User D/ | ☐ | 5/03/2021 |
| User E | Doc.34887.pdf | | /User E/ | ☐ | 5/13/2021 |
| User F | Doc.9012.pdf | ✓ | /User F/ | ☐ | 4/27/2021 |
| User G | Doc.98671.pdf | | /User G/ | ☐ | 3/30/2021 |
| User H | Doc.Tm832.pdf | | /User H/ | ☐ | 5/07/2021 |
| User I | Doc.3058.pdf | | /User I/ | ☐ | 4/16/2021 |
| User K | Doc.Doc.pdf | | /User K/ | ☐ | 5/08/2021 |

| User Name | Document | Available | Signature | Verified | Uploaded on |
|---|---|---|---|---|---|
| User A | Doc.71025.pdf | | User A/ | ☐ | 4/29/2021 |
| User B | Doc.2113.pdf | | User B/ | ☐ | 5/23/2021 |
| User C | Doc.079.pdf | ✓ | User C/ | ☐ | 4/19/2021 |
| User D | Doc.01259.pdf | | User D/ | ☐ | 5/03/2021 |
| User E | Doc.34937.pdf | | User E/ | ☐ | 5/13/2021 |
| User F | Doc.9012.pdf | ✓ | User F/ | ☐ | 4/27/2021 |
| User G | Doc.98371.pdf | | User G/ | ☐ | 3/30/2021 |
| User H | Doc.Tim8k2.pdf | | User H/ | ☐ | 5/07/2021 |
| User I | Doc.3058.pdf | | User I/ | ☐ | 4/16/2021 |
| User K | Doc.Doc.pdf | | User K/ | ☐ | 5/08/2021 |

Items (10)

Control Overlay(s) — 218
Search... — 210
261
230
262
DISABLED

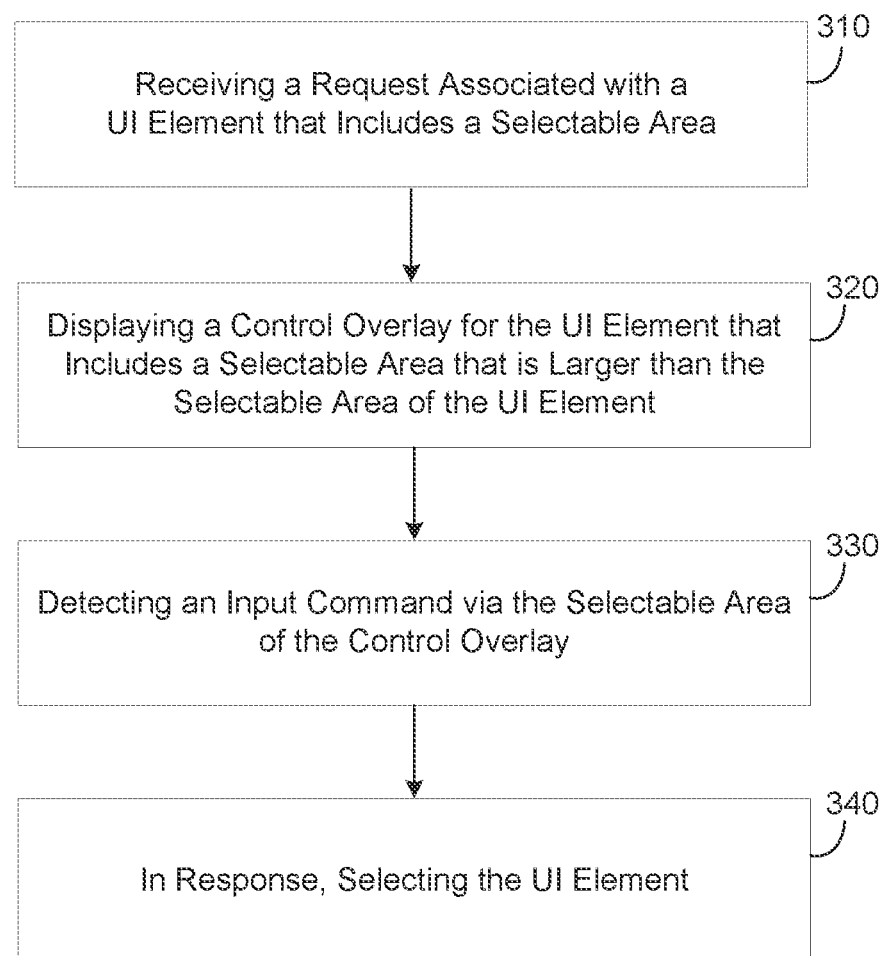

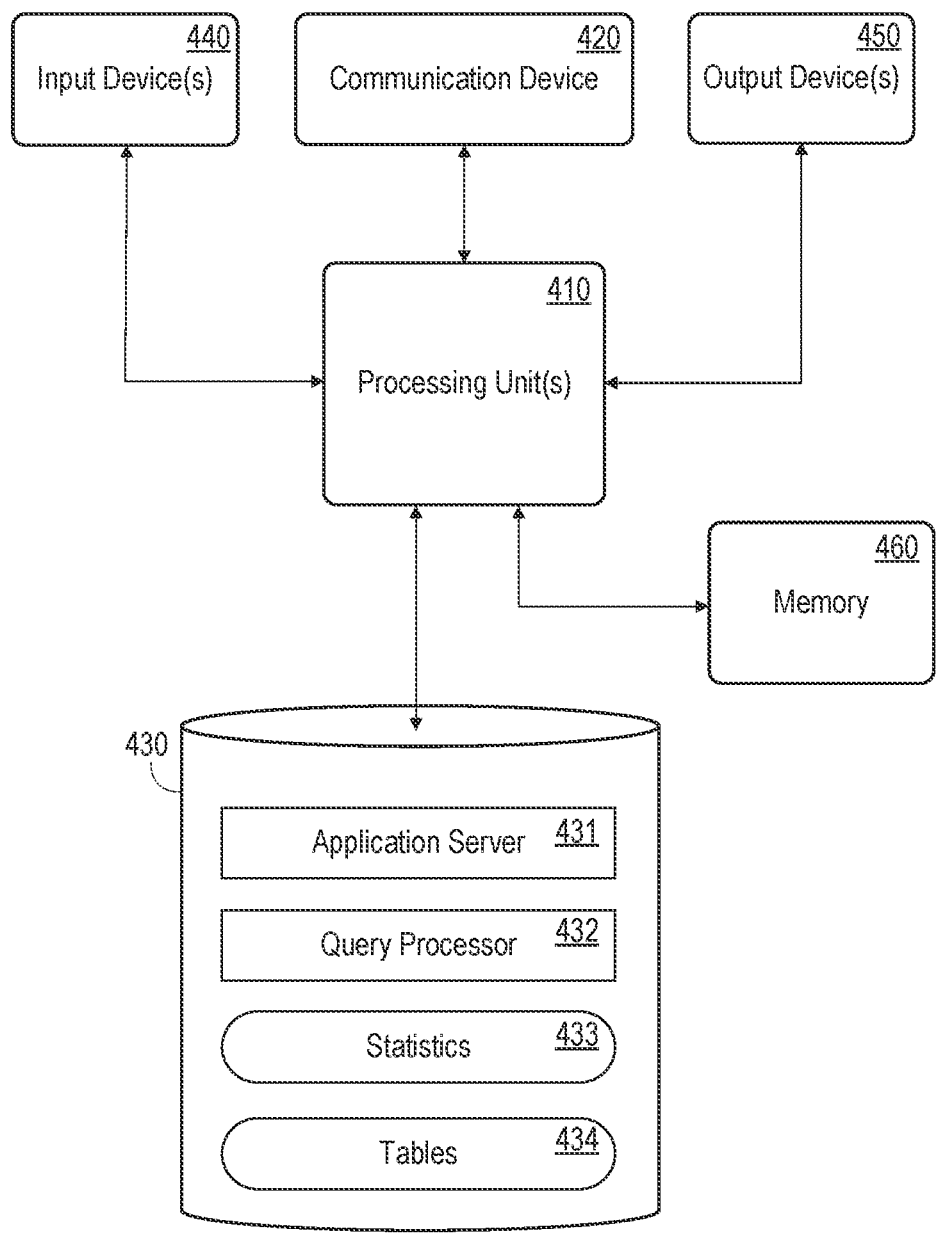

CONTROL OVERLAY FOR USER INTERFACE ELEMENTS

BACKGROUND

User interface elements such as checkboxes, radio buttons, and the like, require precision interaction from a user on a small selectable area. For example, in the case of a checkbox, the "box" that needs to be checked may only be a few pixels wide and a few pixels tall on the screen. Placing the cursor on the correct area of pixels may be difficult and may require a user to move their cursor around the screen for a bit until a correct placement has been made. Furthermore, in cases where a user has a visual impairment, the selection process can be even more difficult and time consuming.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 2A-2K are diagrams illustrating examples of a control overlay in accordance with various example embodiments.

FIG. 3 is a diagram illustrating a method of implementing a control overlay for a user interface element in accordance with an example embodiment.

FIG. 4 is a diagram illustrating a computing system for use in the embodiments that are described herein.

Figure 1:
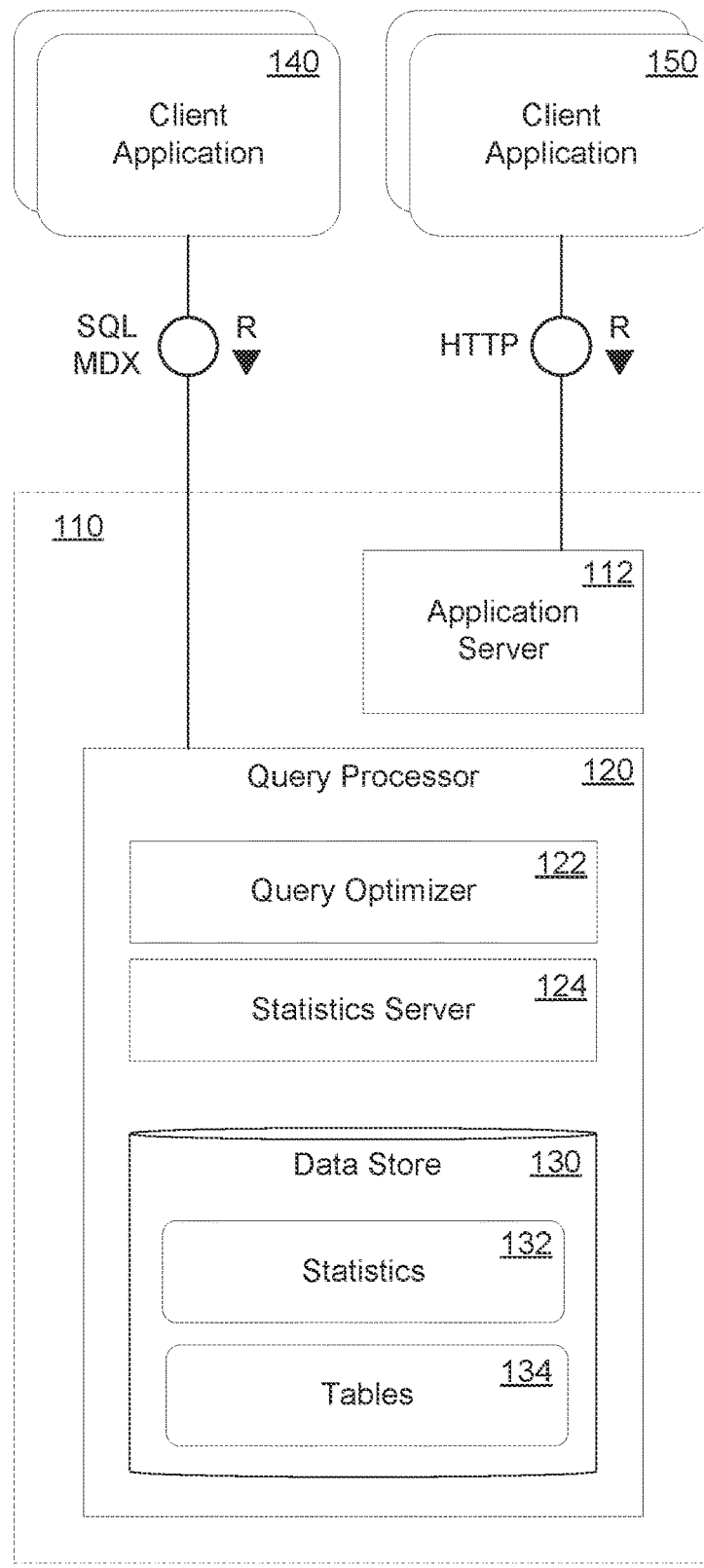
FIG. 1 is a diagram illustrating an example of a database system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a control overlay (e.g., an additional interactive visual element layer) for a user interface that can be laid over another user interface element such as a checkbox, or the like. The control overlay is interactive because it can receive and detect selections via the user interface and pass them through to a user interface element displayed underneath. The control overlay comprises a larger selectable area than a selectable area of the user interface element (or group of user interface elements). Furthermore, the control overlay may communicate with the underlying user interface element or user interface module that includes the user interface element and control a selectable area of the user interface element based on selections that are input and detected on the selectable area of the control overlay. Because the selectable area of the control overlay is larger than the selectable area of the user interface element, the selectable area of the user interface element is enlarged making it easier for the software to recognize user inputs.

In some embodiments, the selectable area of the control overlay may be visually distinguished from other areas of the user interface making it easily recognizable. For example, the selectable area of the control overlay may be partially translucent and may include a different color, shading, highlighting, etc, with respect to the remaining areas of the user interface. Accordingly, the control overlay may create a selectable area for a content portion of the underlying user interface and simultaneously highlight the content portion of the underlying user interface. Furthermore, the control overlay may comprise a settings option which allows the remaining areas of the user interface (including other UI elements, buttons, directional arrows, etc.) to be deactivated and/or darkened to further improve the interaction with the control overlay and the underlying user interface element.

As an example, a software application may have an application template that uses a checkbox as an input field. Here, the checkbox may have a size of a predetermined number of pixels on the user interface. A control overlay may be provided for the checkbox and may communicate with the checkbox. In this example, the control overlay may have a selectable area that is larger in size (i.e., more pixels) than the selectable box of the checkbox element. Furthermore, the selectable area of the control overlay may be laid over the selectable area of the checkbox and visually encompass the selectable area of the checkbox such that an additional selectable area is visually added around the selectable box.

In some embodiments, the control overlay may be used with tabular-based views such as tables, spreadsheets, documents, and the like. In this example, a control overlay may be used to improve the selectable area of entire columns of data. For example, user interface elements may be displayed in groups of user interface elements that include one or more columns and one or more rows of user interface elements. A corresponding control overlay may comprise a rectangular design that covers an entire column of user interface elements including blank spaces of the application template in between the user interface elements, and not just a single user interface element. Here, the control overlay may be one large continuous selectable area that includes a plurality of horizontal lines therein that divide the selectable area into smaller zones. Here, each zone may correspond to a different user interface element in the column. This raster-based design enables easy management of database records and other data that is viewable in tabular form.

The control overlay may include an outer boundary with one or more movable elements (e.g., bars, etc.) that can be selected, draggers, moved, etc., by a user input thereby causing the selectable area of the control overlay to change by increasing or decreasing in size. In some embodiments, only two sides of the outer boundary of the control overlay may be movable/reconfigurable, while the remaining sides are statically disposed. For example, a height of the control overlay may be fixed to a corresponding height of an underlying column/table. Meanwhile, the width may be movable and adjustable. For example, a pair of bars may be disposed on opposing sides of the outer boundary of the control overlay corresponding to the two sides of the column. Here, the bars can be moved in either direction to thereby adjust the width of the control overlay. In other words, a user can shift the individual boundaries left and right allowing both the location of the selectable area to be moved and a width of the highlighted area to change.

Once highlighted over a column with checkboxes, the control overlay may create bigger cells around the smaller cells of the column including cells with checkboxes and cells without checkboxes. When a user wants to select a checkbox, the user can click on the checkbox itself. In addition, the user can click (place a cursor and press) on any part of the selectable area of the cell of the control overlay that corresponds to the checkbox, and the overlay will detect the check, and cause the checkbox to be selected. Furthermore, multiple overlays may be displayed at once for multiple different columns. Furthermore, remaining selectable areas (e.g., columns) of the screen can be disabled and non-disabled. In disabled mode, the rest of the user interface (other than what's covered by the control overlay) is not clickable. In non-disabled (non-modal) the rest of the user interface is still clickable.

FIG. 1 illustrates an example of a database system 100 in which selectivities may be determined according to some embodiments. It should be appreciated that a database architecture of the present application is not limited to the architecture shown in FIG. 1. Referring to FIG. 1, the database system 100 may include a node 110 (e.g., a database node, a server node, a virtual machine, etc.) which may be part of a larger group of nodes. Generally, the node 110 may receive a query (e.g., SQL query, OQL query, XQuery, etc.) from any of client applications 140 and 150 and return results thereto based on data stored within a data store 130 of the node 110. In this example, the node 110 may execute program code to provide an application server 112 and query processor 120. The application server 112 provides services for executing server applications. For example, Web applications executing on an application server may receive Hypertext Transfer Protocol (HTTP) requests from client applications 150 as shown in FIG. 1.

Query processor 120 may include the stored data and engines for processing the data. In this example, query processor 120 is responsible for processing Structured Query Language (SQL) and Multi-Dimensional eXpression (MDX) statements and may receive such statements directly from client applications 140.

Query processor 120 includes a query optimizer 122 for use in determining query execution plans and a statistics server 124 for determining statistics used to estimate query execution plan costs. The statistics server 124 may generate such statistics based on other stored statistics as described herein including histograms with distinct value sketches integrated therein. For example, in response to reception of a query consisting of a conjunct of several predicates on a stored table (or view) of the node 110, the statistics server 124 may estimate selectivity of the query based on known selectivities of various conjuncts of the query predicates.

In some embodiments, underlying database data capable of being queried may be stored in a data store 130 that includes tables 134 such as row-based data, column-based data, and object-based data. Here, the tables 134 may store database content that is accessible to the client applications 140 and 150 In addition, the data store 130 may include statistics 132 such as the histograms/histogram objects described herein which include the distinct value sketches integrated therein. Buckets within the histogram objects may be generated based on rows/columns of data from the tables 134. Furthermore, the data within the tables 134 may be indexed and/or selectively replicated in an index (not shown) to allow fast searching and retrieval thereof. The node 110 may support multi-tenancy to separately support multiple unrelated clients by providing multiple logical database systems which are programmatically isolated from one another.

In some embodiments, the node 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

According to various embodiments, when the query processor 120 receives a database query from one of the client applications 140 and 150, the query processor 120 may trigger the query optimizer 122 to generate a query execution plan for the database query. The query optimizer 122 may access one or more histograms (with distinct value sketches embedded therein) from the data store 130 (e.g., statistics 132) to identify statistics of the database associated with the data to be queried. This data can then be used by the query optimizer 122 to generate an accurate query execution plan for the database query. Here, the query optimizer 122 uses the statistics 132 including the histograms described herein to calculate costs of each query. The generated query execution plan can then be executed to carry out the database query on the tables 134 and return the results to the client applications 140 and 150.

The client applications 140 and 150 may include user interfaces that may employ the control overlay that is described herein. For example, data that is queried from the tables 134 may be viewed in tabular format or spreadsheet format via a user interface of any of the client applications 140 and 150. The control overlay may be used to improve the interaction with the native user interface elements of the client applications 140 and 150. In some embodiments, the control overlay may be implemented within a library, code module, etc., that is made available to developers of the client applications 140 and 150.

FIGS. 2A-2K illustrate various examples of a control overlay in accordance with various example embodiments. In these examples, the control overlay is laid over columns within a tabular view of data elements, but embodiments are not limited thereto. It should be appreciated that the control overlay may be any desired shape, size, etc., and may be used over any desired amount of user interface elements, including one single user interface element. In some embodiments, the control overlay may automatically size itself to a size of a column height on which the control overlay is laid over.

FIG. 2A illustrates a view 200A of a user interface 210 that includes a plurality of data items/records being viewed in a tabular format. Here, each row in the table corresponds to a different data record. The user interface 210 includes a plurality of columns 211, 212, 213, 214, 215, and 216 of data including both text-based non-interactive data values such as the values displayed in columns 211, 212, 214, and 216, and interactive user interface elements such as checkboxes displayed in columns 213 and 215. In this example, a user has moved a cursor 202 to a checkbox 204 and clicked on or otherwise input a command to the checkbox 204 thereby creating a selection of the checkbox 204. In this example, the user must move the cursor 202 such that it is aligned inside of the boundary of the checkbox 204.

Figure 2B:
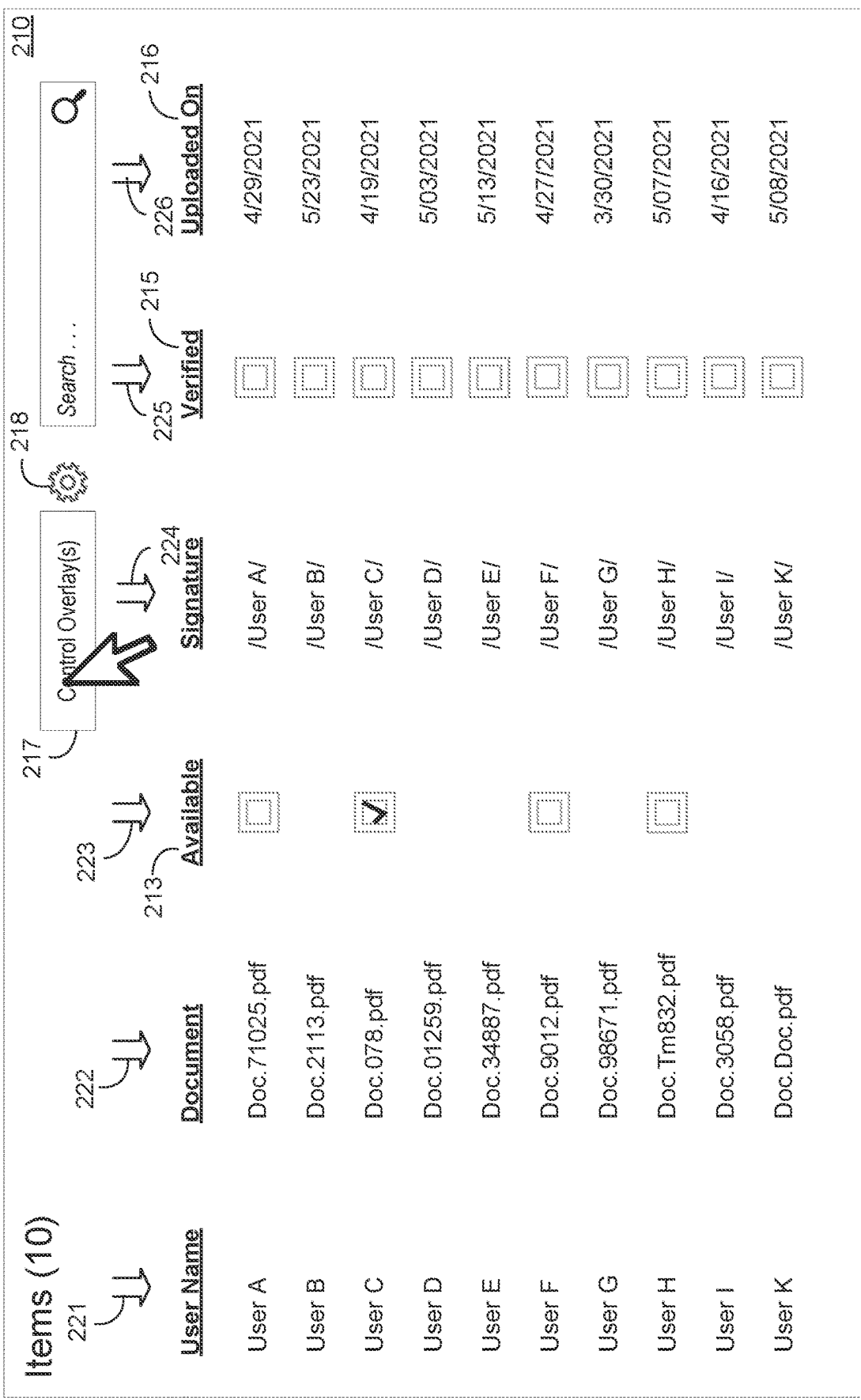
Figure 21:
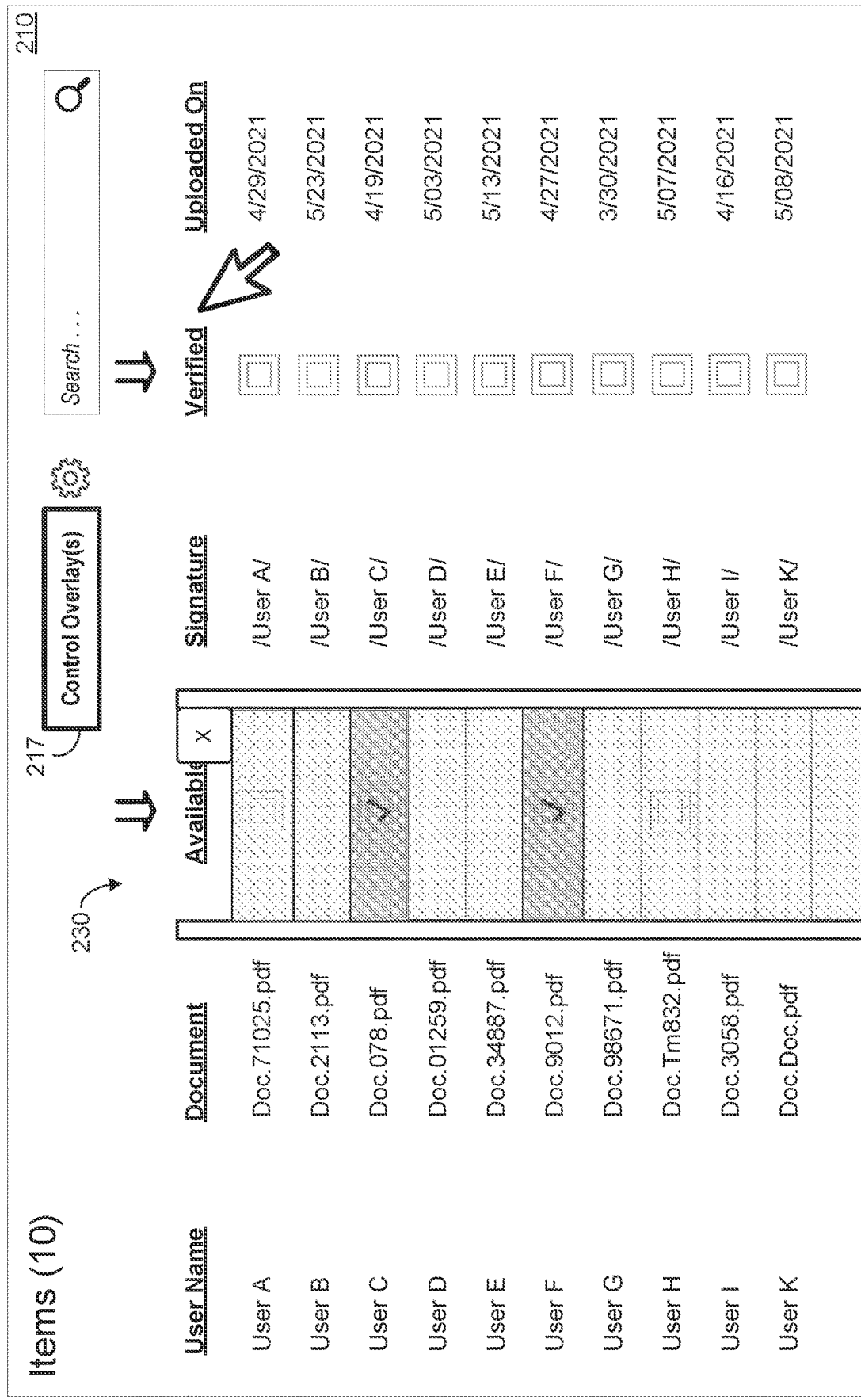

FIG. 2B illustrates a view 200B of a user interacting with a control overlay activation button 217 which is embedded within a menu bar at the top of the user interface 210. Here, the control overlay activation button 217 may be clicked on by the user through manipulation of the cursor. For example, the user may use a pointer of some kind (e.g., mouse, stylus, finger, etc.) and move the cursor over the control overlay activation button 217 and press/click on the control overlay activation button 217. In response, the user interface 210 may display identifiers above each of the columns including identifiers 221, 222, 223, 224, 225, and 226, corresponding to columns 211, 212, 213, 214, 215, and 216, respectively.

For example, the identifiers 221, 222, 223, 224, 225, and 226 may initially be displayed in a first color (e.g., red). When selected, the identifiers may change color, size, highlighting, bolding, etc. However, not all identifiers may be selectable. For example, identifiers 221, 222, 224, and 226 correspond to columns that cannot receive a control overlay. If the user were to move the cursor over one of these identifiers and click on it, the user interface 210 may not respond or may display an error message next to the column indicating that the column cannot receive a control overlay because it does not have a particular type of user interface element (e.g., checkbox, radio button, etc.)

In this example, the identifiers 221, 222, 223, 224, 225, and 226, are arrows and the arrows are interactive. Referring to FIG. 2C, a user has moved the cursor and clicked on the identifier 223 as shown in view 200C. In response, the user interface 210 may display a control overlay 230 as further described in FIG. 2D. In addition, as further shown in the view 200C of FIG. 2C, the user interface 210 may change a display content of the identifier 223 (e.g., change the color from red to green, change the bolding, change the highlighting, change the size, etc.) to indicate that the identifier 223 has been selected.

FIG. 2D illustrates a view 200D of the control overlay 230 that is displayed by the user interface 210 (or the application that includes the user interface 210) in response to a click or other input command on the identifier 223. In response to activating the control overlay 230, the control overlay activation button 217 may change colors, shading, highlight, etc., with respect to the control overlay activation button 217 prior to the activation of the control overlay 230 (i.e., prior to selection of the identifier 223) to indicate that the control overlay 230 is active. Although not a requirement, in some embodiments, the user interface 210 may hide the other identifiers 221, 222, 224, 225, and 226 of other columns in response to the user selecting identifier 223 such that the other identifiers 221, 222, 224, 225, and 226 are out of the way while the user interacts with the control overlay 230. In this case, the user may initiate the identifiers 221, 222, 223, 225, and 226 by pressing on the control overlay activation button 217. As another example, the identifiers 221, 222, 224, 225, and 226 may remain displayed, but for convenience, they are not shown in some of the diagrams.

Here, the control overlay 230 includes a selectable area 233 having a rectangular shape or box shape. The selectable area 233 has the same height as an underlying selectable area of the column 213 and includes a top side, a bottom side, and two opposing sides. A pair of bars 231 and 232 are disposed on the two opposing sides of the control overlay 230, respectively. Each bar (231 and 232) is individually movable (e.g., horizontally slidable, etc.) with respect to the other bar. For example, either of the bars (also referred to as sliders) can be dragged or otherwise slid horizontally causing the width of the selectable area 233 to change size in a horizontal direction (i.e., to get wider or narrower, etc.) while the height of the selectable area 233 remains fixed. In addition, the control overlay 230 includes a close button 235 which can be selected by the user via a pointer device, finger, etc. to close the control overlay 230.

According to various embodiments, the control overlay may include a plurality of horizontal lines 234 that horizontally break-up or divide the selectable area 233 into a plurality of cells such as cell 244, cell 245, cell 246, etc. In FIG. 2D, the control overlay 230 includes eleven cells and ten rows of data. Here, the different cells may correspond to a different rows of the underlying table displayed within the user interface 210. The cells may have the same height as each other, or different heights. Also, the cells may have the same width as each other which is equal to a width of the selectable area 233. In this example, a checkbox 227 for the third record has been selected already by a user prior to the control overlay 230 being displayed. To distinguish that this checkbox 227 has already been checked, the control overlay 230 may initially change colors, shading, highlighting, translucency, etc. of a cell 246 within the control overlay 230 that corresponds to (i.e., is laid over) the checkbox 227, thereby distinguishing the checkbox 227 which has been selected from other checkboxes (e.g., in rows 1, 6, and 8) that have not been selected/checked. This may be performed as the control overlay 230 is initialized and displayed for the first time in response to the selection of the identifier 223.

In some embodiments, the cells may be mapped to the user interface elements by the software described herein. For example, the checkbox 227 may have an identifier that is mapped to an identifier of the cell 246 of the control overlay 230. Thus, when the cell 246 is selected, the control overlay 230 software can identify the corresponding user interface element (e.g., checkbox 227) that needs to be selected.

FIG. 2E illustrates a view 200E of an interaction of a cursor with the control overlay 230. In this example, a user moves the cursor over a cell 238 that is laid over a checkbox 240. Here, the user checks a point 239 on the cell 238 of the control overlay 230 that corresponds to the checkbox 240. In response, the control overlay 230 may send a request or other instruction to the user interface 210 causing the user interface to check/select the checkbox 240. That is, in this case, the user has selected a point 239 that is not directly over the checkbox 240, but is instead adjacent to and independent of the checkbox 240. In other words, the point 239 is not encompassed by the outer boundary of the checkbox 240. Despite this, the control overlay 230 may still cause the checkbox 240 to be selected. Thus, as long as the cursor is somewhere on the larger selectable area of the cell 238, the checkbox 240 is selected.

FIG. 2F illustrates a view 200F of the control overlay 230 being interacted with by a user. In this example, a user has moved the cursor over the bar 231 and pressed down on a mouse key, touch screen, etc. to hold the bar 231 that has been selected and drag the bar 231 toward the left. In response, the control overlay 230 changes a width of the selectable area 233 of an entirety of the control overlay 230. Thus, anywhere the user clicks and drags on the bar 231 may cause an entirety of the selectable area 233 for all rows of data in the column 213 to move left or right (wider or narrower). As can be seen, the selectable area 233 of the control overlay 230 is partially translucent. Therefore, underlying content such as text, buttons, boxes, fields, checkboxes, radio buttons, etc. are still visible even when the selectable area 233 is overlayed on top of the underlying content. Thus, a user can view the corresponding UI elements that are controlled by the cells within the selectable area 233 of the control overlay 230.

FIG. 2G illustrates a view 200F of the user interface 210 where a user has launched a second control overlay 260. Here, the user has clicked on the identifier 225 corresponding to the column 215. In response, the user interface 210 may display the control overlay 260 that corresponds to the user interface elements displayed within the column 215. Here, the control overlay 260 has a same height as the column 215 and the control overlay 230. However, the control overlay 260 may have a different width, and may also have its own side bars capable of being used to modify/change a width of a selectable area of the control overlay 260. Furthermore, the control overlay 260 may have a selectable area that is less than the height of the column or more than the height of the column.

In the example of FIG. 2G, the control overlay 260 has the same number of cells therein as the control overlay 230, however, some of the cells in the control overlay 230 do not have underlying user interface elements, whereas all of the cells in the control overlay 260 have corresponding underlying user interface elements. The control overlay 260 is separately and individually movable with respect to the control overlay 230. For example, the side bars of the control overlay 260 may be moved independently of the bars 231 and 232 of the control overlay 230. In some embodiments, the user interface 210 may prevent or otherwise block the control overlays 230 and 260 from overlapping each other. For example, if the user were to try to drag a side bar of the control overlay 260 across or over the control overlay 230, the user interface may stop the bar from moving pas the side bar 232 of the control overlay 230.

FIG. 2H illustrates a view 200G of a user closing the control overlay 260. Here, the user moves the cursor over a close button 265 and presses on the close button 265 (e.g., via a mouse click, touch input, keyboard command, etc.). In response, the user interface 210 may close the control overlay 260 and remove it from the user interface 210 so that it is no longer visible on the screen as shown in view 200H of FIG. 2I.

FIG. 2J illustrates a view 200J of a user interacting with a settings menu 250 by pressing on a settings button 218 within the menu bar of the user interface 210. Here, the settings menu 250 offers multiple choices for selection including a modal mode button 251 and a non-modal mode button 252. When the non-modal mode button 252 is selected, the remaining areas on the screen may be deactivated or otherwise disabled. In addition, the remaining areas may be darkened or otherwise marked to indicate that they are no longer active such as shown in a view 200K of FIG. 2K.

In the example of FIG. 2K, a remaining area 261 and a remaining area 262 are deactivated and darkened with shading in response to the non-modal mode button 252 being selected from the settings menu 250. If the user were to select the non-modal mode button 252, the user interface 210 would return to the view 200I show in FIG. 2J. The deactivation may include deactivating other areas of the user interface that are not visually covered by the selectable area of the control overlay 230. The deactivation of the remaining areas 261 and 262 disables those areas of the user interface from detecting inputs. In other words, if a user uses a mouse or other pointer to select a deactivated area, the screen will not detect the selection on the deactivated area because it is disabled. Darkening is a visual indicator to the user that the area is disabled.

Some of the benefits provided by the control overlay include an exaggerated or otherwise enlarged selectable area for user interface elements that have static/fixed sized selectable areas such as checkboxes and radio buttons. The control overlay may communicate with the underlying user interface elements. Thus, when a selection is made to the control overlay, the control overlay may identify the corresponding user interface element associated with the selected area and cause a selection of the user interface element.

FIG. 3 illustrates a method 300 of implementing a control overlay for a user interface element in accordance with an example embodiment. As an example, the method 300 may be performed by a web server, a cloud platform, an on-premises server, a database node included within a distributed database system, a user device, and the like. Referring to FIG. 3, in 310, the method may include receiving a request associated with a user interface element from among a plurality of user interface elements displayed within a user interface. Here, the user interface element may include a selectable area such as a button or a box that receives input commands and changes a display of the selectable area in some way (e.g., fills-in the button, checks the box, or the like).

In 320, the method may include displaying a control overlay for the user interface element via the user interface. For example, the control overlay may be partially translucent and include a selectable area that is larger than and encompasses the selectable area of the user interface element. Here, the selectable area of the control overlay may be an extension of the selectable area of the underlying user interface element because the selectable area of the control overlay can be used to select the selectable area of the user interface element (i.e., causing the button to be filled in, the box to be checked, or the like). In 330, the method may include detecting an input command via the selectable area of the control overlay. In response to the detection of the input command, in 340, the method may include selecting the user interface element displayed via the user interface.

In some embodiments, the control overlay may include a rectangular image (e.g., bitmap, etc.) that encompasses the checkbox and an area around the checkbox. For example, the control overlay may include one or more cells each having a box-shaped selectable area that is larger than a selectable area of the underlying user interface element which may have a box-shaped selectable area that is smaller than the box-shaped selectable area of the control overlay. In some embodiments, the method may further include deactivating other selectable areas on the user interface that are not covered by the control overlay in response to displaying the control overlay for the user interface element. In some embodiments, the method may further include darkening other selectable areas on the user interface in response to displaying the control overlay for the user interface element.

In some embodiments, the method may further include modifying one or more of a color and a shading of the selectable area of the control overlay that encompasses the user interface element in response to detection of the selection of the selectable area. In some embodiments, the method may further include displaying a first slider and a second slider on opposing outer sides of the selectable area of the control overlay, wherein the first slider is configured to move a first side boundary of the control overlay and the second slider is configured to move a second side boundary of the control overlay. In some embodiments, the method may further include moving the first side boundary of the control overlay in a direction in response to an input command that drags the first slider in the direction.

FIG. 4 is a diagram of a server node 400 according to some embodiments. The server node 400 may include a general-purpose computing apparatus and may execute program code to perform any of the functions described herein. The server node 400 may comprise an implementation of the node 110 shown in FIG. 1, in some embodiments. It should also be appreciated that the server node 400 may include other unshown elements according to some embodiments and may not include all of the elements shown in FIG. 4.

Server node 400 includes processing unit(s) 410 (i.e., processors) operatively coupled to communication device 420, data storage device 430, input device(s) 440, output device(s) 450, and memory 460. Communication device 420 may facilitate communication with external devices, such as an external network or a data storage device. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into the server node 400. Output device (s) 450 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 460 may comprise Random Access Memory (RAM). In some embodiments, the data storage device 430 may store user interface elements in tabular form. For example, one or more columns and one or more rows of user interface elements may be displayed in a two-dimensional spreadsheet, table, document, digital structure, or the like.

Application server 431 and query processor 432 may each comprise program code executed by processing unit(s) 410 to cause server node 400 to perform any one or more of the processes described herein. Such processes may include estimating selectivities of queries on tables 434 based on statistics 433. Embodiments are not limited to execution of these processes by a single computing device. Data storage device 430 may also store data and other program code for providing additional functionality and/or which are necessary for operation of server node 400, such as device drivers, operating system files, etc As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a processor configured to:
        process a first user input to activate a control overlay;
        process a second user input comprising a request associated with two or more user interface elements from among a plurality of user interface elements displayed within a user interface, each of the two or more user interface elements having particular dimensions and being associated with an initial selectable area, the received request comprising a request to enlarge the initial selectable area corresponding to each of the two or more user interface elements;
        initiate display of the control overlay for each of the two or more user interface elements via the user interface, the control overlay being partially translucent and comprising an enlarged selectable area for each of the two or more user interface elements that is larger than and encompasses the initial selectable area of each of the two or more user interface elements, wherein the two or more user interface elements remain visible and have the particular dimensions after initiation of the display of the control overlay;
        detect an input command via the enlarged selectable area of the control overlay for at least one of the two or more user interface elements; and
        in response to detection of the input command, select the at least one of the two or more user interface elements displayed via the user interface.

2. The computing system of claim 1, wherein the user interface element comprises a checkbox with a box-shaped selectable area and the selectable area of the control overlay comprises a box-shaped selectable area that is larger than the box-shaped selectable area of the checkbox.

3. The computing system of claim 2, wherein the control overlay comprises a rectangular image that encompasses the checkbox and an area around the checkbox.

4. The computing system of claim 1, wherein the processor is further configured to deactivate other selectable areas on the user interface in response to displaying the control overlay for the user interface element.

5. The computing system of claim 1, wherein the processor is further configured to darken other selectable areas on the user interface in response to displaying the control overlay for the two or more user interface elements.

6. The computing system of claim 1, wherein the processor is configured to modify one or more of a color and a shading of the selectable area of the control overlay to that encompasses the user interface element in response to detection of the selection of the selectable area.

7. The computing system of claim 1, wherein the processor is further configured to display a first slider and a second slider on opposing outer sides of the selectable area of the control overlay, wherein the first slider is configured to move a first side boundary of the control overlay and the second slider is configured to move a second side boundary of the control overlay.

8. The computing system of claim 7, wherein the processor is further configured to move the first side boundary of the control overlay in a direction in response to an input command that drags the first slider in the direction.

9. A method comprising:
receiving a first user input to activate a control overlay;
receiving a second user input comprising a request associated with two or more user interface elements from among a plurality of user interface elements displayed within a user interface, each of the two or more user interface element having particular dimensions and being associated with an initial selectable area, the received request comprising a request to enlarge the initial selectable area corresponding to each of the two or more user interface elements;
displaying the control overlay for each of the two or more user interface elements via the user interface, the control overlay being partially translucent and comprising an enlarged selectable area for each of the two or more user interface elements that is larger than and encompasses the initial selectable area of each of the two or more user interface elements, wherein the two or more user interface elements remain visible and have the particular dimensions after initiation of the display of the control overlay;;
detecting an input command via the enlarged selectable area of the control overlay; and
in response to the detection of the input command, selecting the at least one of the two or more user interface elements displayed via the user interface.

10. The method of claim 9, wherein the user interface element comprises a checkbox with a box-shaped selectable area and the selectable area of the control overlay comprises a box-shaped selectable area that is larger than the box-shaped selectable area of the checkbox.

11. The method of claim 10, wherein the control overlay comprises a rectangular image that encompasses the checkbox and an area around the checkbox.

12. The method of claim 9, wherein the method further comprises deactivating other selectable areas on the user interface in response to displaying the control overlay for the two or more user interface elements.

13. The method of claim 9, wherein the method further comprises darkening other selectable areas on the user interface in response to displaying the control overlay for the user interface element.

14. The method of claim 9, wherein the method further comprises modifying one or more of a color and a shading of the selectable area of the control overlay that encompasses the user interface element in response to detection of the selection of the selectable area.

15. The method of claim 9, wherein the method further comprises displaying a first slider and a second slider on opposing outer sides of the selectable area of the control overlay, wherein the first slider is configured to move a first side boundary of the control overlay and the second slider is configured to move a second side boundary of the control overlay.

16. The method of claim 15, wherein the method further comprises moving the first side boundary of the control overlay in a direction in response to an input command that drags the first slider in the direction.

17. A method comprising:
receiving a first user input to activate a control overlay;
receiving a second user input comprising a request associated with a column from among a plurality of columns displayed within a user interface, the column comprising a plurality of selectable items, each of the selectable items having particular dimensions;
displaying the control overlay for the column via the user interface, the control overlay being partially translucent and comprising a plurality of selectable areas corresponding to the plurality of selectable items of the column, where the plurality of selectable areas are larger than and encompass the plurality of selectable items of the column, respectively wherein the selectable items remain visible and have the particular dimensions after initiation of the display of the control overlay;
detecting an input command via a selectable area of the control overlay; and
selecting, via the user interface, a selectable item of the plurality of selectable items that corresponds to the selectable area of the control overlay where the input command is detected.

18. The method of claim 17, wherein the displaying the control overlay comprises displaying a partially translucent image that includes a plurality of cells encompassing the plurality of selectable items.

19. The method of claim 17, wherein the control overlay comprises a height that is less than or equal to a height of the column.

20. The method of claim 17, wherein the method further comprises
receiving a request associated with a second column from among the plurality of columns displayed within the user interface, and in response, displaying a second control overlay for the second column via the user interface.

* * * * *